United States Patent [19]
Schmeling

[11] 3,877,394
[45] Apr. 15, 1975

[54] PNEUMATICALLY CONTROLLED RAILROAD BOX CAR DOOR LATCHING DEVICE

[76] Inventor: Paul R. Schmeling, 5540 Webster St., Downers Grove, Ill. 60515

[22] Filed: May 9, 1974

[21] Appl. No.: 468,401

[52] U.S. Cl. .............. 105/395; 105/1 A; 105/240; 160/1; 188/34; 188/124
[51] Int. Cl. ............................................ E05b 65/20
[58] Field of Search ........ 303/86; 188/34, 112, 124; 105/1 A, 240, 286; 160/1, 8; 49/279; 292/DIG. 46

[56] References Cited
UNITED STATES PATENTS

| | | | |
|---|---|---|---|
| 1,665,952 | 4/1928 | Feeney et al. | 105/395 |
| 1,776,559 | 9/1930 | Hobbs | 105/395 |
| 1,779,780 | 10/1930 | Pilla | 105/395 |
| 1,804,443 | 5/1931 | Smith | 105/395 |

*Primary Examiner*—M. Henson Wood, Jr.
*Assistant Examiner*—Richard A. Bertsch
*Attorney, Agent, or Firm*—Charles B. Cannon

[57] ABSTRACT

A railroad car door latching devices embodying means operatively connected to and responsive to the air brake system of a railroad box car for latching the plug type doors and the slidable doors of railway box cars in closed position and against unauthorized opening. The new railroad car door latching device is such that if the door is opened by an unauthorized person an air leak is established in the air brake system, of which the car is a part, and all of the cars to the rear of the car in which the leak in the air brake system has occurred will be unable to move because the air brakes thereon will become set, and the train crew in the caboose will thus be advised as to the failure of the air brake system in the train rearwardly of the car in which the leak has occurred. The train crew in the caboose will thereupon communicate by two way radio telephone with the engineer in the cab of the locomotive to determine whether or not he has cut off the air in the air brake system, and the train cannot be operated until the opened car door has been closed and the leak in the air brake system of the damaged car has been corrected. A manually controlled air release valve is provided for manually releasing the car door latching device when an authorized person desires properly to open the car door.

10 Claims, 13 Drawing Figures

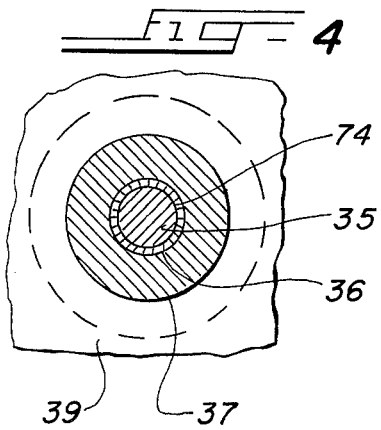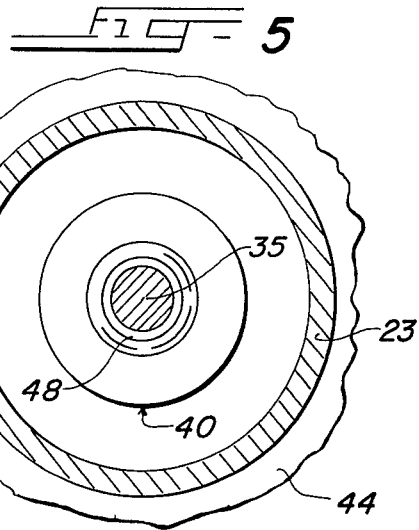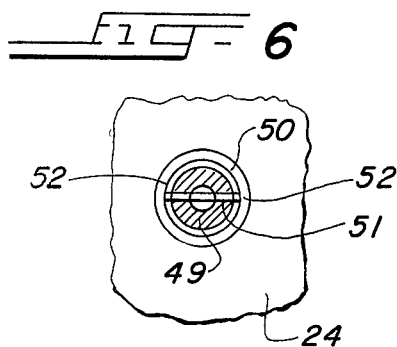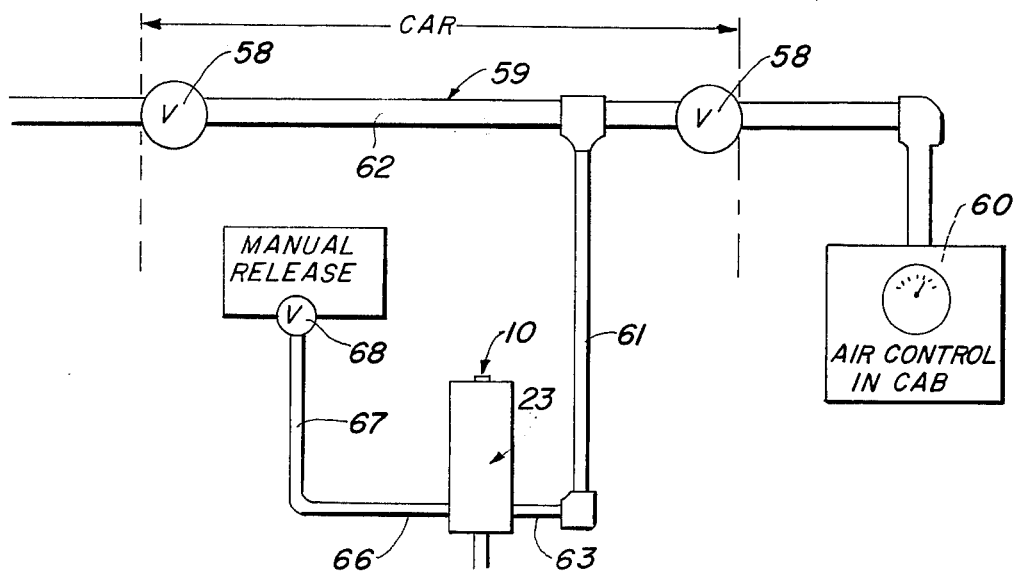

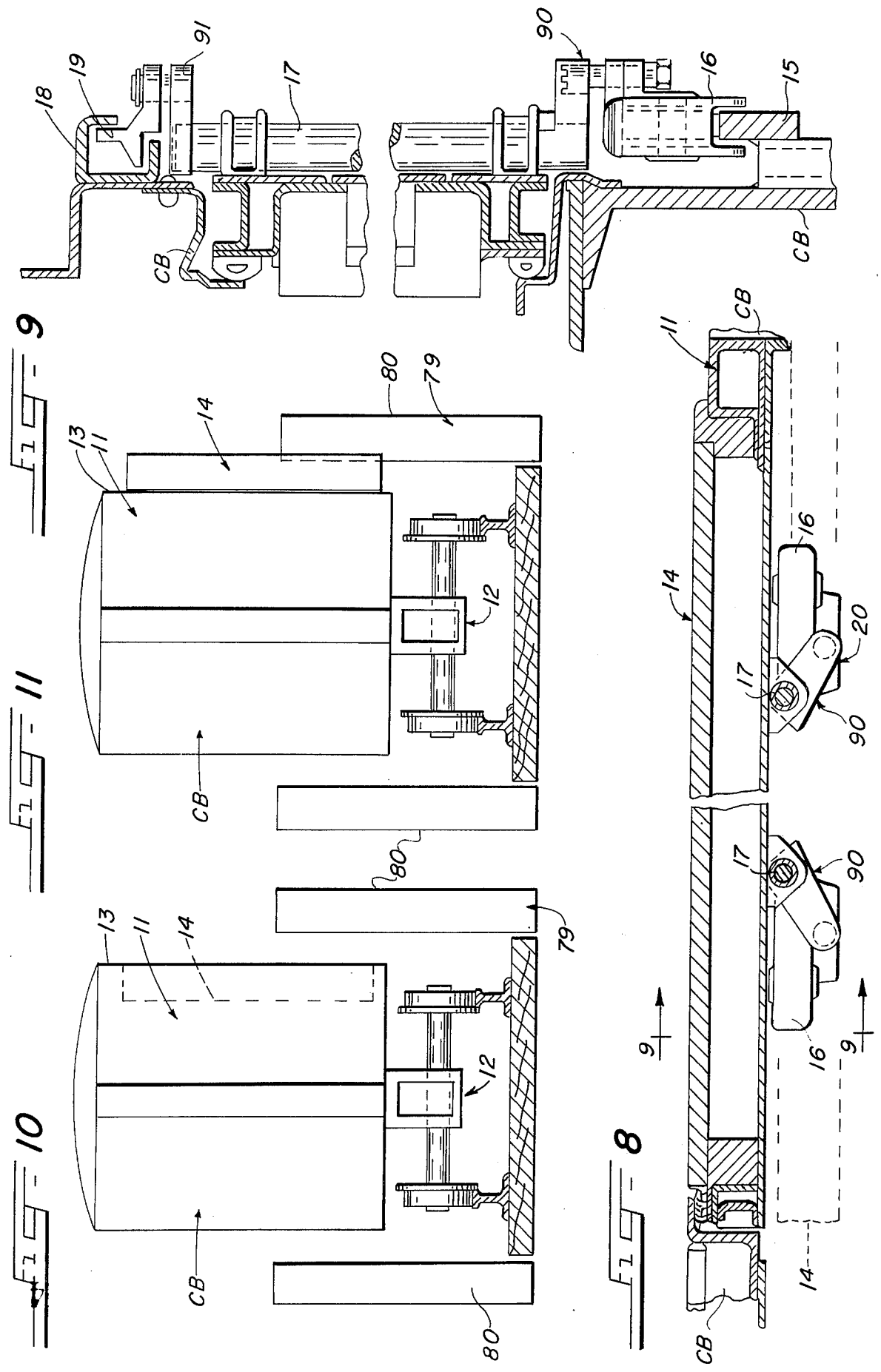

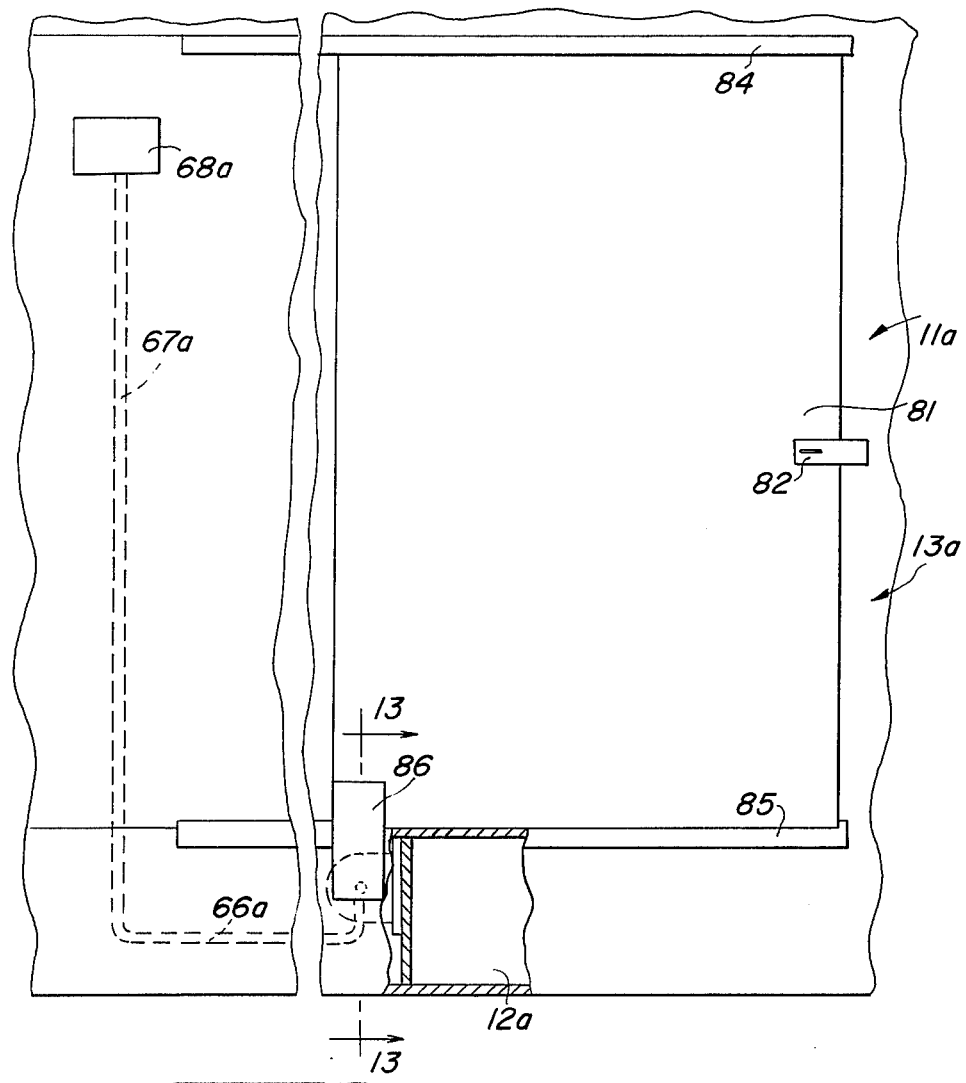
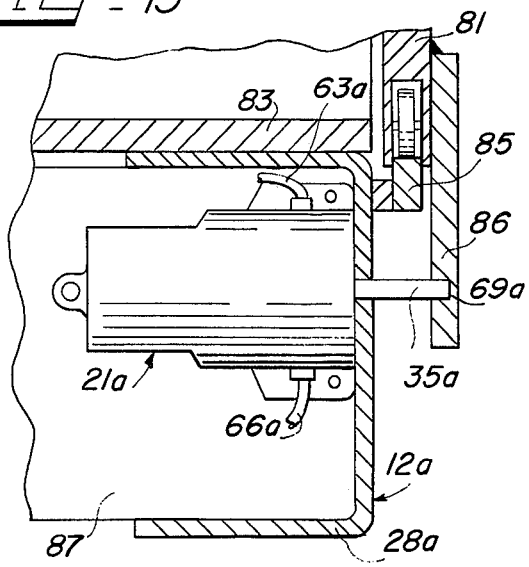

PNEUMATICALLY CONTROLLED RAILROAD BOX CAR DOOR LATCHING DEVICE

BACKGROUND OF THE INVENTION

A serious problem exists in connection with railroad box cars and which resides in the fact that car thieves and vandals will pry open the so-called plug type doors and the so-called sliding doors of railroad box cars after they have been made up as a part of a train at a terminal and throw the merchandise out of the car as it is moved with the train. In addition, as a result of opening the plug type doors of such railroad box car doors the plug type car doors are frequently left in open position outwardly of the plane of the wall of the car with the result that as the train with the thus pilfered or vandalized car moves through or across certain types of bridges, highway overpassed, and the like, having upwardly projecting side walls or units, or through other narrow spaces, the outwardly extended plug type car door will engage such an obstruction and be torn from the body of the car with resultant substantial expense to the railroad or other car owner in replacing the plug type car door and danger of injury to persons from the falling plug type car door which may fall from an overpass or the like onto a street or highway therebelow.

DESCRIPTION OF FIGURES IN THE DRAWINGS

FIG. 4 is a sectional detail view on line 4—4 in FIG. 2;

FIG. 5 is a sectional detail view on line 5—5 in FIG. 2;

FIG. 6 is a sectional detail view on line 6—6 in FIG. 2;

FIG. 7 is a schematic view illustrating the air brake system of the railroad box car and the relationship thereto of the pneumatically controlled car door latching device of the present invention;

FIG. 8 is a sectional plane view on line 8—8 in FIG. 1 illustrating a typical railway box car door of the plug type and a typical operating mechanism therefor;

FIG. 9 is a transverse sectional view on line 9—9 in FIG. 8;

FIG. 10 is an elevational view of a typical railway box car showing the plug type car door thereon in closed position;

FIG. 11 is a rear elevational view of the railway box car shown in FIG. 10 and showing the plug type car door is open position and extended outwardly of the plane of the side wall of the car and about to engage the side of a bridge, overpass, or the like;

FIG. 12 is a fragmentary front elevational view, partly in section, of a railway box car which is provided with a so-called sliding car door, as distinguished from a car door of the plug type, and illustrating a modified form of the invention applied thereto; and FIG. 13 is an enlarged fragmentary sectional view on line 13—13 in FIG. 12.

OBJECTS OF THE INVENTION

An object of the invention is to provide a new and improved pneumatically operated railroad car door latching device embodying means which are operatively interconnected to and are responsive to the air brake system of the car so that when the car is made up into and as part of a train the train cannot be moved if the car door on the car has been tampered with or if the car door has been moved out of its proper closed position on the side wall of the car.

Another object of the invention is to provide a new and improved pneumatically operated railroad car door latching device which will effectively prevent railroad car thieves and vandals from removing the car door from its mountings and gaining access to the interior of the car for the purpose of stealing its contents.

A further object of the invention is to provide a railway car door latching device of the type heretofore described and which may be used in conjunction with railway car doors of both the plug type and of the so-called sliding type.

A further object of the invention is to provide therein a manully operated air release for the pneumatically operated railroad box car latching apparatus so that the pneumatically operated car door latching device may be released by a person authorized to open the door.

Other objects will appear hereinafter.

DETAILED DESCRIPTION OF THE FORM OF THE INVENTION ILLUSTRATED IN FIGS. 1 TO 11, INCLUSIVE

Figure 1:
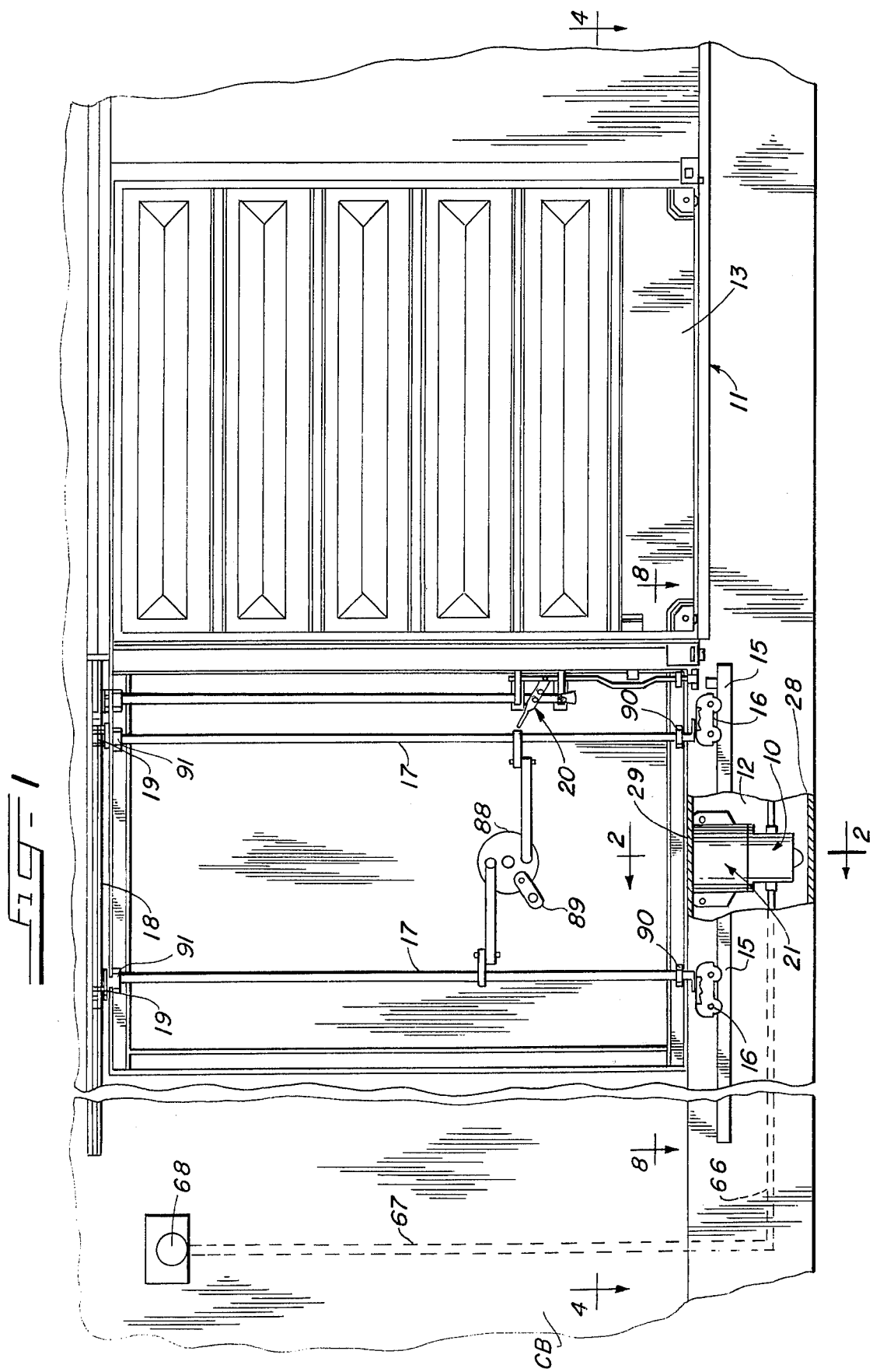
FIG. 1 is a side elevational view of a railroad box car which embodies a movable plug type car door and illustrating the present invention installed on the supporting frame of the car below and in operative association with the movable plug type car door.

A typical and preferred embodiment of the present invention is illustrated in FIGS. 1 to 11, inclusive, of the drawings, wherein it is generally indicated at 10, and is shown associated with a railroad box car, which is generally indicated at 11, and which includes a supporting frame 12. A car body CB is carried by the supporting frame 12 and includes a side wall 13 and a car door 14 of the so-called plug type, the lower portion of which is movably mounted on a lower horizontal trackway 15 by means of car door rollers 16 which are carried by upright door-operating rod members 17. The upper portion of the car door 14 is movably mounted on guide members 19 which work in an upper channel-shaped horizontal trackway 18 in which upwardly projecting guide members 19 are movable; the lower trackway 15 and the upper trackway 18 being mounted in the side wall 13 of the car body CB. The lower car door rollers 19 and the upper guide members 19 are carried by and are swivally mounted on horizontally spaced rod members 17 (FIGS. 1 and 9), which are arranged at the front of the car door 14 and are interconnected for simultaneous movement by means of an operating mechanism 88 which includes a handle 89 (FIG. 1).

As shown in FIGS. 1 and 9, the lower end portions of the vertically extending car door operating rod members 17 are swivally attached by link mechanisms 90 to the lower rollers 16 and the upper end portions of the car door operating rod members 17 are swivally connected to the upper guide members 19 by means of link mechanisms 91.

A conventional manually operable door-latching device 20 is mounted on the side wall 13 of the car 11 (FIG. 1). Such a railway car door 12 of the so-called plug type is so mounted and the operating mechanism that when the car door 12 is in closed position it is normally disposed in coplanar relationship with the side wall 13 of the car body CB but is movable outwardly out of the plane of the side wall 13 of the car body CB for slidable movement along the trackways 15 and 18 into outwardly extended and open position. The parts thus far described are conventional in and are well understood in the art and do not form a part of the present invention which will now be described.

Figure 2:
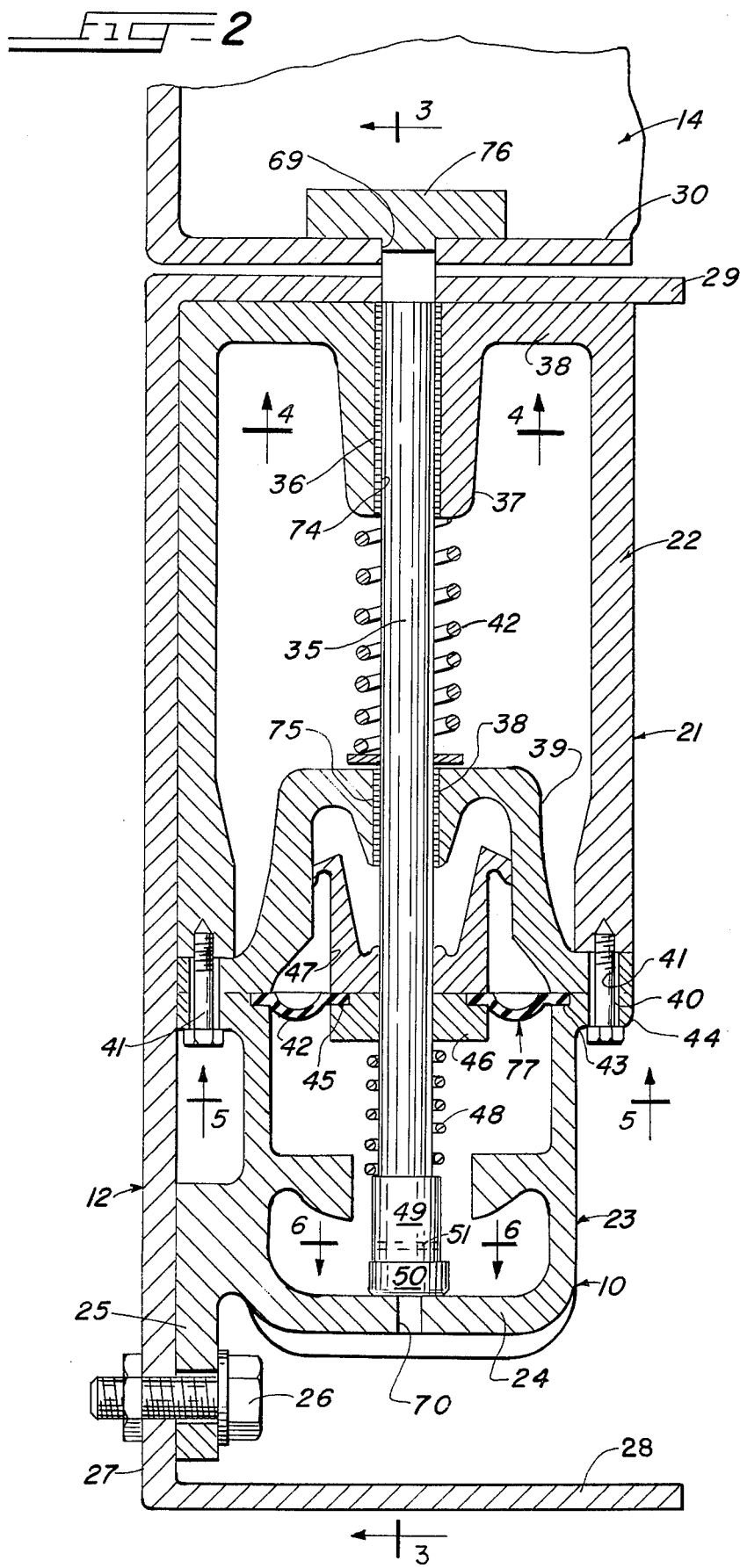
FIG. 2 is an enlarged sectional view of the invention on line 2—2 in FIG. 1.
Figure 3:
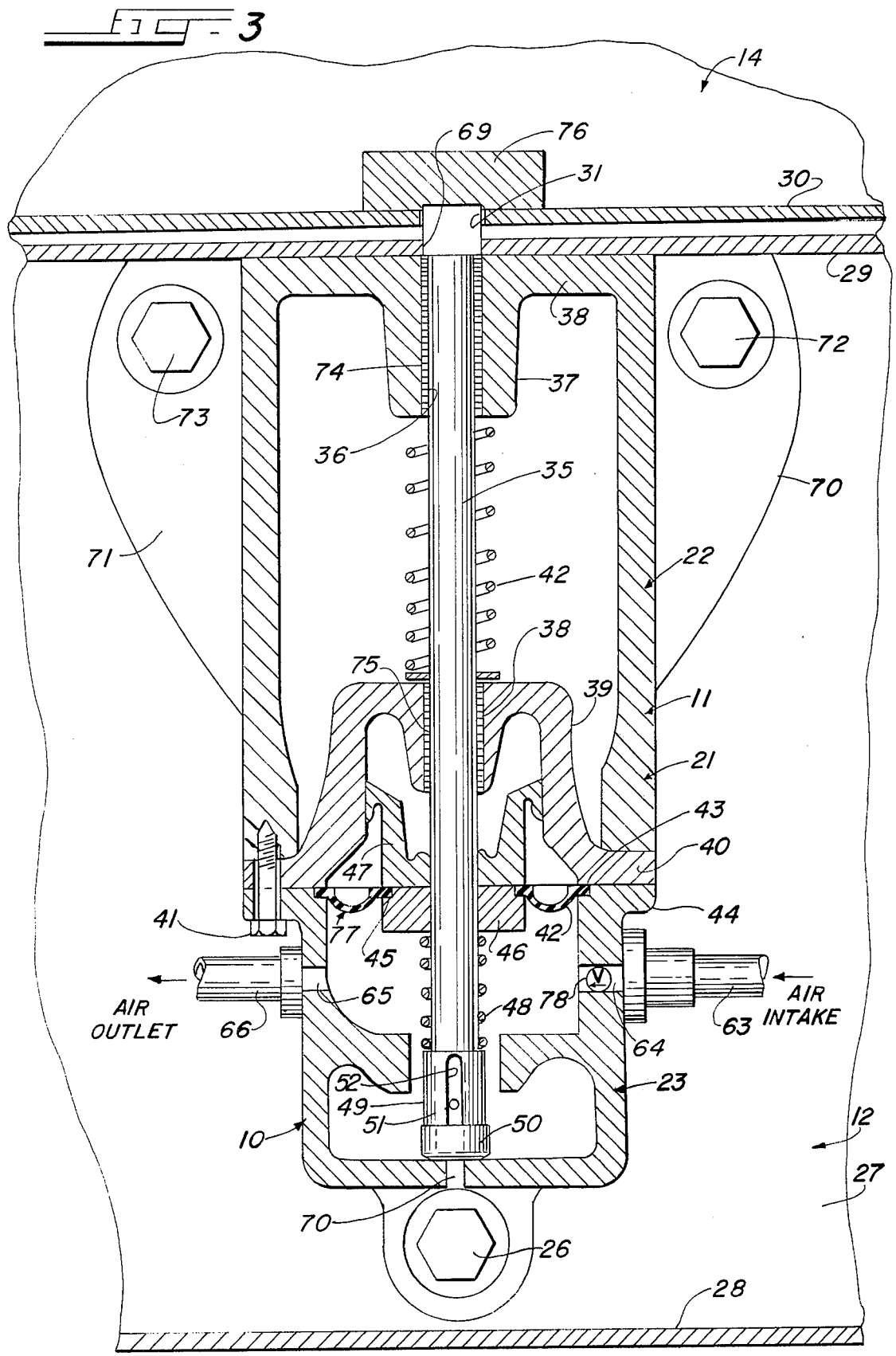
FIG. 3 is a vertical sectional view on line 3—3 in FIG. 2.

A typical and preferred form of the present invention, as used in conjunction with the railway box car doors of the plug type, is illustrated particularly in FIGS. 2 to 11, inclusive, of the drawings, and comprises an air valve housing 21 which includes an upper portion 22 and a lower portion 23 which includes a bottom wall 24 having a vertically extending depending flange portion 25 which is attached, as by suitable fastening means in the form of bolt and nut units 26, to a vertically extending wall 27 of the car supporting frame 12. In addition, the air valve housing 21 has side flanges 20 and 71 which are attached, by suitable fastening means, in the form of bolt and nut units 72 and 73, respectively, to the wall 27 of the supporting frame 12 of the car (FIG. 3). The wall 27 of the car supporting frame 12 includes a lower horizontal portion 28 and an upper horizontal portion 29 which extends generally parallel to the lower horizontal portion 28 above the air valve housing 21 (FIG 2).

The railroad car door 14 includes a latching plate member 30 which is attached, in any suitable manner, to the car door 14 and is disposed above the car wall portion 27 and above the air valve housing 21 (FIGS. 2 and 3) and this latching plate member 30 has a latching recess 31 formed therein for the reception of the upper end portion of a vertically extending latching rod member 35 which is slidably mounted in the air valve housing 21 (FIGS. 2 and 3). A stop or motion-limiting member 76 is mounted on the wall 30 of the car door 14 above the latching recess 34 therein (FIGS. 2 and 3). Similarly, the horizontal wall 29 of the car supporting frame 12 has a latching recess 69 formed therein for the reception of the upper end portion of the latching rod member 35 (FIGS. 2 and 3).

The upper end portion of the latching rod member 35 is guided in a passageway 36 which is formed in a boss 37 which is formed as an intergral part of and depends from the top wall 38 of the air valve housing 21. Similarly, the lower end portion of the latching rod member 35 is slidably guided in a passageway 38 which is formed in a bell-shaped member 39 which has a peripheral flange 40 at its lower end and the peripheral flange 30 is attached to a peripheral flange 44 on the lower end portion of the body of the valve housing 21 by fastening elements in the form of bolts 41.

The latching rod member 35 is normally urged downwardly by a coil spring 42 which is mounted on the latching rod member 35 between the boss 37 and the bell-shaped member 39 (FIGS. 2 and 3).

An air operating means or unit 77 is mounted on the latching rod member 35 (FIGS. 2 and 3) and this air operating means or unit 77 includes a flexible diaphragm member 42 which may be made of rubber, elastomeric material, or the like, and has an outer annual peripheral flange portion 45 which is fastened between a cylindrical member 46 and a slidable valve member 47, both of which are mounted on and attached to the latching rod member 35 (FIGS. 2 and 3).

As shown in FIGS. 2 and 3, the valve member 47 is slidably guided within the bell-shaped member 39. Suitable air packing material 74 is provided in the passage 36 in the boss 37 around the latching rod member 35 and similar air packing material 75 is provided in the passage 38 around the latching rod member 35 (FIGS. 2 and 3).

A coil spring 48 is mounted on the lower end portion of the latching rod member 35 between the member 46 and a collar 49 which is loosely mounted on the latching rod member 35, and a cylindrical resilient rubber or like sealing member 50 is also loosely mounted on the latching rod member 35 below and is attached to the collar 49 (FIGS. 2 and 3). A pin 51 is attached to and is mounted in the lower end portion of the latching rod member 35 and the outer end portions of the pin 51 extend into and work in a pair of aligned vertically extending slots 52 which are formed in the collar 49 (FIGS. 2, 3 and 6). An air escape vent opening 70 is provided in the bottom wall 24 of the air valve housing 23 and is normally closed by the rubber or like sealing member 50 (FIGS. 2 and 3).

The air brake system of the railroad car 11 is generally indicated at 59 (FIG. 7) and includes a main air line 62 and suitable air control valves 58–58 which are mounted at the end portions of the car 11, and air control means 60 which is located in the cab of the locomotive of the train of which the car 11 forms a part. A branch air line 61 leads from the main air line 62 of the air brake system 59 of the railroad car 11, by way of an air intake or supply line 63, and an air inlet 64, to the interior of the valve housing 23 below the valve diaphragm 42 (FIG. 3). A check valve 78 is provided in the air intake inlet 64 to the valve housing 23 (FIG. 3).

The valve housing 23 has an air outlet opening 65 formed therein (FIG. 3) and this air outlet opening 65 is connected by way of a branch air line 66–67 to a manually operable release valve unit 68 of conventional design, and which is mounted at a high point on the side wall 13 of the railroad car 11 and as remote as possible from the car door 14 so that it is out of reach of a thief standing in the car door opening or on the roadbed below the car 11.

A railroad bridge or overpass, or the like, is generally indicated at 79 and includes upwardly extending side frames or walls 80 (FIGS. 10 and 11).

OPERATION OF THE FORM OF THE INVENTION ILLUSTRATED IN FIGS. 1 TO 11, INCLUSIVE, OF THE DRAWINGS

In the use of the form of the new railroad car door latching apparatus shown in FIGS. 1 to 11, inclusive, with a car door 14 of the plug type, when the air pressure in the air brake system 59 of the railroad car 11, and the train in which it is incorporated, is actuated, air flows from the main air line 62 by way of the branch line 61–63 and the air inlet 64 and check valve 78, into the valve housing 23, wherein it acts upon the flexible valve diaphragm 42 to raise the flexible diaphgram 77, and the members 46 and 47 on the latching rod member 35, thereby raising the latching rod member 35 against the action of the coil spring 42, and thereby causing the upper end portion of the latching rod member 35 to engage in the latching recesses or openings 69 and 31, in the wall portion 29 of the car supporting frame 12 and in the latching plate member 30, respectively, (FIGS. 2 and 3), thereby securely and effectively latching the car door 14 against unauthorized opening. The upward movement of the latching rod member 35 is limited by the stop member 76 which is mounted on the latching plate member 30.

However, if for any reason a thief or vandal should succeed in opening the car door 14, the stop member 76 will be moved with the car door latching plate members 30 out of alignment with and away from the upper end portion of the latching rod member 35. This action will cause the pin 51 on the lower end portion of the latching rod member 35 (FIGS. 2 and 3) to ride upwardly in the slots 52 in the collar 49 until the pin 51 engages the upper end portions of the slots 52 whereupon this action of the pin 51 will slidably move the collar 49 and the resilient sealing member 50 attached thereto upwardly on and relative to the latching rod member 35 and against the action of the coil spring 48, thereby raising the resilient sealing member 50 upwardly away from the air escape outlet or vent opening 70 in the bottom wall 24 of the air valve housing 23 and thus allowing air to escape therefrom to the atmosphere. This air venting action creates a leak in the air brake system 59 of the car and shuts off the air in the air brake system in all cars of the train behind or rearwardly of the car 11 and sets the air brakes thereon, so that the train cannot then be operated. The train men in the caboose, being normally in communication with the engineer in the cab of the locomotive by a two way radio telephone system, will thereupon communicate with the engineer in the cab of the locomotive to determine whether or not he has cutt off the air in the train and upon being advised by the engineer that he has not done so, the train crew will proceed forwardly to locate the car in which the air leak has occurred and will then locate the damaged and opened car. Thus the damaged opened car door 14 must be repaired or replaced before the air brake system of the train can be rendered operative and the train again moved.

If and when it is desired to manually release the new car door latching device 10 while the car 11 is standing at a station, or on a siding, or like place, this may be accomplished by manipulating the manual release control valve 68 which will allow air to flow out of the valve housing 23 by way of the outlet 65 and the line 66-67 and the manually operable release valve 68 to open the air brake system 59 and thus permit the car door 14 to be opened by an authorized person.

DESCRIPTION OF THE MODIFIED FORM OF THE INVENTION ILLUSTRATED IN FIGS. 12 AND 13 OF THE DRAWINGS

A modification of the invention, as applied to a railway car door of the so-called sliding type, as distinguished from a railway car door of the so-called plug type, is illustrated in FIGS. 12 and 13 of the drawings, and those parts thereof which are similar to or correspond to parts in the form of the invention illustrated in FIGS. 1 to 11, inclusive, have been given the same reference numerals followed by the additional and distinguishing reference character a.

Thus, in the form of the invention illustrated in FIGS. 12 and 13 a railway box car is generally indicated at 11a and includes a side wall 13a in which a car door 81 of the so-called sliding type is mounted, the car door 81 being adapted to be latched to the side wall 13a of the car 11a by a suitable latching device 82.

In the form of the invention illustrated in FIGS. 12 and 13 of the drawings, the floor of the railway box car 11a is indicated at 83 and a pair of upper and lower trackways 84 and 85 respectively, are mounted on the car supporting frame 12a. A latch plate member 86 is mounted on and depends from the car door 81 at the bottom and on the outer side thereof, and a latching recess 69a is formed in the latching plate member 86 (FIG. 13). The air valve housing 21a is mounted in a horizontal position on a supporting member 87 which is attached to and is suspended from the floow 83 of the car 11a and the latching rod member 35a projects horizontally therefrom and the outer end portion of the latching rod member 35a is adapted to latchingly engage in the latching recess 69a in the latching plate member 86 (FIG. 13).

OPERATION OF THE MODIFIED FORM OF THE INVENTION ILLUSTRATED IN FIGS. 12 AND 13, OF THE DRAWINGS

The use and operation of the modified form of the invention illustrated in FIGS. 12 and 13 of the drawings are, in general, similar to the use and operation of the form of the invention illustrated in FIGS. 1 to 11, inclusive, except that the modified form of the invention illustrated in FIGS. 12 and 13 is especially adapted for use in connection with a railway box car or refrigerator car which is equipped with so-called sliding doors as distinguished from a car door of the plug type as in the case of the form of the invention illustrated in FIGS. 1 to 11, inclusive.

Thus, in the modified form of the invention illustrated in FIGS. 12 and 13, when the sliding car door 81 is in its normal closed position, the outer end portion of the latching rod member 35a is disposed in latching engagement with and in the latching recess 69a in the latching plate member 86. However, if and when the sliding car door 81 is moved into open position by a vandal or other unauthorized person, the outer end portion of the latching rod member 35a will be moved out of latching engagement with the latching recess 69a in the latching plate member 86, thereby breaking the air line in all of the cars to the rear of the car 11a and shutting off the air supply thereto, with the same results as have been described hereinbefore in connection with the preferred form of the invention illustrated in FIGS. 1 to 11, inclusive. However, when the car 11a and the car door 81 have been repaired, and the air brake system in the train has been restored to its normal operating condition, the outer end portion of the latching rod member 35a will again latchingly engage in the latching recess 69a in the latching plate member 86.

It will thus be seen from the foregoing description, considered in conjunction with the accompanying drawings, that the present invention provides a new and improved railroad car door latching device having the desirable advantages and characteristics and accomplishing its intended objects including those herein pointed out and others which are inherent in the invention.

I claim:

1. A railroad box car door latching device comprising, in combination:
   a. a railroad car including
      1. a supporting frame;

2. a box car body mounted on the said supporting frame and having therein
  a. a car door opening; and including
  b. a car door movably mounted on the said box car body for closing the said car door opening and movable into and out of closed and open position;
b. an air brake system for supplying air under pressure to the brakes of the said railroad car;
c. car door latching means for latching the said car door in closed position to close the said car door opening and against unauthorized movement of the said car door into open position;
d. said car door latching means including
  1. an air valve housing mounted on the said supporting frame;
  2. a first latching member on the said car door;
  3. a second car door latching member movably mounted in the said air valve housing and having
    a. a latching portion adapted to latchingly engage the said first latching member on the said car door to prevent unauthorized movement of the said car door from closed into open position;
  4. operating means in the said air valve housing for moving the said second car door latching member and the said latching portion thereof into latching engagement with the said first car door latching member to prevent unauthorized movement of the said car door from closed into open position; and
e. means for supplying air under pressure from the said air brake system of the said railroad car to the said air valve housing and to the said operating means therein to urge the said second car door latching member and the said latching portion thereof into latching engagement with the said first car door latching member to prevent unauthorized movement of the said car door from closed into open position.

2. A railroad box car door latching device as defined in claim 1 in which
  a. the said air valve housing includes
    1. a wall having
      a. an air outlet escape opening formed therein; and in which
  b. the said car door latching device includes
    1. resilient sealing means in the said air valve housing under the control of the said second car door latching member for sealing the said air outlet escape opening in the said wall of the said air valve housing when the said latching portion of the said second car door latching member is in effective and latching position.

3. A railroad car door latching device as defined in claim 2 in which the said air valve housing has
  a. a second and auxiliary air escape outlet opening; and in which the said car door latching device includes
  b. an auxiliary air line leading from the said second and auxiliary air escape outlet comprising; and
  c. manually operable valve means mounted on the said body of the said railroad box car and in the said auxiliary air line for manually opening the second and auxiliary air escape outlet opening from the said air valve housing.

4. A railraod box car door latching device as defined in claim 3 in which a. the said manually operable valve means is mounted on the said railroad box car body at a point located upwardly from and remote from the bottom of the said railroad box car door and the said car door opening therefor.

5. A railraod box car door latching device as defined in claim 2 which includes
  a. means coacting with the said second door latching member for moving the said resilient sealing means out of sealing engagement with the said air outlet escape opening in the said air valve housing when the said car door is moved into an unauthorized open position and into a position to prevent the said second car door latching member from latchingly engaging the said first car door latching member.

6. A railroad box car door latching device as defined in claim 2 in which:
  a. the said first car door latching member has a latching recess formed therein; and in which
  b. the said latching portion of the said second car door latching member is adapted to engage in the said latching recess in the said first car door latching member when the said car door is in closed position in the said car door opening, and which includes
  c. operating means within the said air valve housing and coacting with the said first car door latching member for raising the said resilient sealing means out of sealing engagement with the said air outlet escape opening when the said car door is disposed out of position to enable the said latching portion of the said second car door latching member to engage the said latching recess in the said first car door latching member.

7. A railroad car door latching device comprising, in combination;
  a. a railroad car including
    1. a car body having therein
      a. a car door opening;
    2. an air brake system on the said car body;
    3. a car door movably mounted on the said car body and movable on the said car body into and out of position to close the said car door opening;
  b. latching means mounted on the said car body for latching the said car door in position to close the said door opening;
  c. pneumatic means mounted on the said car body for operating the said latching means and normally urgning the said latching means into latching engagement with the said car door and into position to latch the said car door in closed position;
  d. air supply means for supplying air under pressure from the said air brake system of the said railroad car to the said pneumatic means to urge the said car door latching means into latching engagement with the said car door; and
  e. means under control of the said car door latching means for creating a leak in the said air brake system of the said railroad car if and when the said car door has been moved by an authorized person into open position relative to the said car door opening and out of position to be latchingly engaged by the said latching means.

8. A railroad car door latching device as defined in claim 7 which includes a. manually operable air release valve means mounted on the said car body at a point remote from and manually inaccessible from the said car door opening for manually releasing air from the said air supply means to the atmosphere when it is desired to move the said car door by an authorized person to open position relative to the said car door opening.

9. A railroad box car door latching device as defined in claim 6 in which
   a. the said car door is one of the so-called plug type and when in closed position is disposed in generally coplanar relationship with the said side wall of the said car body but is movable outwardly out of the said car door opening and out of coplanar relationship with the said side wall of the said car body and is slidable lengthwise of the said car body into open position; and in which
   b. the said air valve housing and the said operating means therein including the said second car door latching member are mounted in a generally vertical position on the said car body, and in which
   c. the said latching recess in the said car door extends generally vertically in the said car door for the reception of the said generally vertically extending latching portion of the said second car door latching member when the said car door is in position to close the said car door opening.

10. A railroad box car door latching device as defined in claim 6 in which
    a. the said car door is of the so-called sliding type and when in closed position is disposed generally parallel to the plane of the said side wall of the said car body but outwardly thereof, but is slidably movable along the said side wall of the said car body and lengthwise of the said car body to open position; and in which
    b. the said air valve housing and the said operating means therein including the said second car door latching member are mounted in a generally horizontal position on the said car body, and in which
    c. the said latching device in the said first car door latching member is disposed in a position to receive the said generally vertically extending latching portion of the said second latching member when the said slidable car door is in position to close the said car door opening.

* * * * *